United States Patent [19]

Miyazawa et al.

[11] Patent Number: 4,869,735
[45] Date of Patent: Sep. 26, 1989

[54] ADSORBENT FOR ARSENIC COMPOUND AND METHOD FOR REMOVING ARSENIC COMPOUND FROM COMBUSTION GAS

[75] Inventors: Masaki Miyazawa; Norihisa Kobayashi, both of Tokyo; Hiromu Takatsuka, Nagasaki; Atsushi Morii, Nagasaki; Toshio Koyanagi, Nagasaki; Touru Seto, Hiroshima; Kozo Iida, Hiroshima; Shigeaki Mitsuoka, Hiroshima; Hiroaki Rikimaru, Osaka; Makoto Imanari; Takeo Koshikawa, both of Ibaragi; Akihiro Yamauchi, Koganei; Masayuki Hanada, Kitakyushu; Morio Fukuda, Kitakyushu; Kiyoshi Nagano, Kitakyushu, all of Japan

[73] Assignees: Mitsubishi Jukogyo K.K.; Sakai Chemical Ind. Co., Ltd.; Mitsubishi Petrochemical Co., Ltd.; Mitsubishi Petrochemical Engineering Co., Ltd.; Catalysts & Chemical Co., Ltd., all of Japan

[21] Appl. No.: 187,470

[22] Filed: Apr. 28, 1988

[30] Foreign Application Priority Data

Apr. 30, 1987 [JP] Japan ................... 62-104447

[51] Int. Cl.$^4$ ................... B01D 19/00; B01D 53/02
[52] U.S. Cl. ................... 55/72; 55/74; 55/75; 423/210; 423/239; 423/328; 423/592; 423/604; 423/605; 423/606; 423/608; 423/610; 423/618; 423/622; 423/625; 423/628; 423/633; 423/635
[58] Field of Search ................... 55/74, 75, 68, 72; 423/239, 210

[56] References Cited

U.S. PATENT DOCUMENTS

| | | | |
|---|---|---|---|
| 711,187 | 10/1902 | Stone | 55/72 |
| 798,302 | 8/1905 | Scharff et al. | 55/72 |
| 3,812,653 | 5/1974 | Massoth et al. | 55/68 |
| 4,578,256 | 3/1986 | Nishino et al. | 55/72 |
| 4,593,148 | 6/1986 | Johnson et al. | 423/210 |
| 4,743,435 | 5/1988 | Kitahara et al. | 423/210 |

FOREIGN PATENT DOCUMENTS

| | | | |
|---|---|---|---|
| 0255121 | 2/1988 | European Pat. Off. | 423/239 |
| 0257307 | 3/1988 | European Pat. Off. | 423/239 |
| 1095796 | 7/1958 | Fed. Rep. of Germany | 55/75 |
| 150599 | 9/1981 | Fed. Rep. of Germany | 55/75 |
| 55-80722 | 6/1980 | Japan | 55/74 |
| 57-77627 | 5/1982 | Japan | 423/210 |
| 60-68034 | 4/1985 | Japan | 423/210 |
| 60-114328 | 6/1985 | Japan | 423/210 |
| 61-129026 | 6/1986 | Japan | 423/210 |
| 62-286521 | 12/1987 | Japan | 423/210 |
| 62-286522 | 12/1987 | Japan | 423/210 |
| 62-286524 | 12/1987 | Japan | 423/210 |
| 62-286525 | 12/1987 | Japan | 423/210 |
| 586120 | 12/1977 | U.S.S.R. | 55/72 |
| 707592 | 1/1980 | U.S.S.R. | 55/74 |

Primary Examiner—John Doll
Assistant Examiner—Wayne A. Langel
Attorney, Agent, or Firm—Jules E. Goldberg

[57] ABSTRACT

Here is provided an adsorbent for adsorbing and removing an arsenic compound which becomes a catalyst poison in a selective contact reduction process for removing nitrogen oxides (NOx) from a combustion exhaust gas by the use of an ammonia as a reducing agent and a denitrating catalyst.

The adsorbent of the present invention comprises a material in which the total volume of pores is 0.2 to 0.7 cc/g and the volume of the pores having a pore diameter of 300 Å or more is 10% or more with respect to the total pore volume, and the material is a specific element, its oxide, an ion-exchanged zeolite or the like.

In addition, the present invention is directed to a method for removing the arsenic compound from the combustion exhaust gas by injecting the adsorbent into the flow of the gas on the upstream side of the denitrating catalyst.

5 Claims, 2 Drawing Sheets

FIG. I(A)
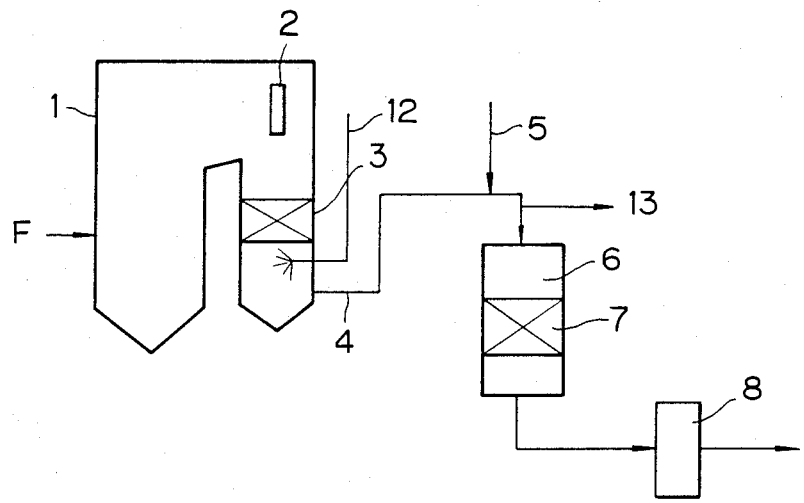
FIG. I(B)
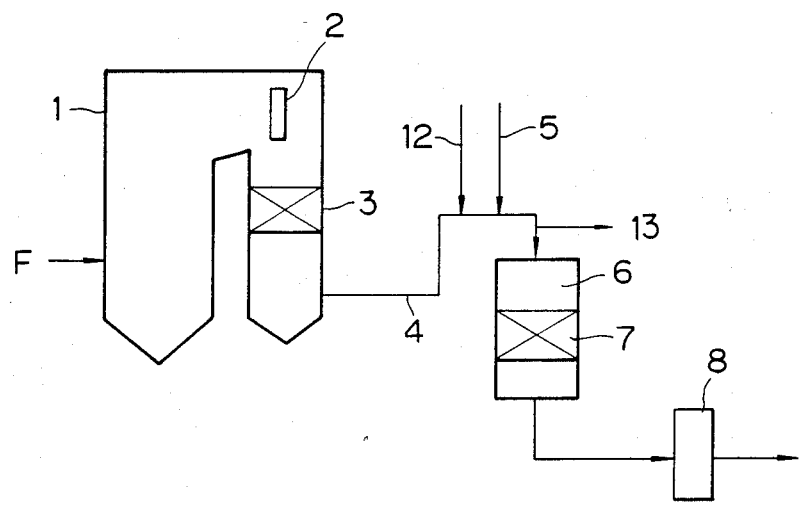

ADSORBENT FOR ARSENIC COMPOUND AND METHOD FOR REMOVING ARSENIC COMPOUND FROM COMBUSTION GAS

FIELD OF THE INVENTION AND RELATED ART STATEMENT

1. Field of the Invention

The present invention relates to an adsorbent for an arsenic compound contained in a combustion exhaust gas and a method of removing the arsenic compound from the combustion exhaust gas. More particularly, it relates to an adsorbent for adsorbing and removing an arsenic compound in a combustion exhaust gas which function as catalyst poisons to a catalyst for removing nitrogen oxides from the exhaust gas, and a method for removing an arsenic compound from a combustion exhaust gas by the use of this adsorbent.

2. Related Art Statement

Heretofore, in order to remove nitrogen oxides (hereinafter referred to simply as NOx) from an exhaust gas which is discharged from a combustion furnace attached to a coal-fired boiler, a heavy oil-fired boiler or each of various chemical devices, a selective catalyst reduction process is widely used on an industrial scale, because of being most economical and being effective.

The selective catalyst reduction process makes use of ammonia as a reducing agent and a denitration catalyst, and it is constituted as in FIG. 3.

That is, in FIG. 3, a combustion exhaust gas discharged from a boiler 1 is guided to a denitrating reactor 6 through a superheater 2, an economizer 3 and a flue 4. An ammonia gas necessary for a denitrating reaction is injected into the denitrating reactor 6 through an ammonia injector 5 disposed at the flue 4.

The Nox in the exhaust gas is decomposed into nitrogen and water while the gas passes through a catalyst layer 7 in the denitrating reactor 6. The combustion exhaust gas coming out through the catalyst layer 7 is discharged into the atmosphere through an air heater 8, an electric dust collector 9, a combustion exhaust gas blower 10 and a chimney 11. The alphabet F in FIG. 3 represents a fuel.

The above-mentioned catalyst layer 7 comprises a gas parallel flow type catalyst having a shape of lattice or plate. In this type of catalyst, the gas flows in parallel with the surface of the catalyst, and therefore the dust in the combustion exhaust gas and the catalyst surface have a little opportunity for the contact therebetween, so that a less amount of the dust is adsorbed on the catalyst surface conveniently. For this reason, this type of catalyst is widely used in a coal-fired boiler, a heavy oil-fired boiler and the like.

The denitration catalyst employed in such a denitration apparatus is composed of a base material of titanium oxide ($TiO_2$) and an active component such as vanadium pentoxide ($V_2O_5$) supported on the base material. The thus constituted catalyst has a high denitration performance in an extensive temperature range.

This kind of catalyst can maintain the high performance in an early period, but the performance deteriorates gradually with the lapse of time. Causes of the deterioration can be considered to be (1) that the dust is deposited on the catalyst surfaces to clog passage orifices for a gas, (2) that a catalyst poison present in the dust diffuses in the catalyst to poison the latter, (3) a substance contained in a fuel which will become the catalyst poison gasifies in a furnace, and is then physically adsorbed on the catalyst or is chemically reacted with a catalyst component, which disturbs the progress of a denitrating reaction, and the like.

In the case that the dust is deposited on the catalyst surface to clog the passage orifice for the gas, dust removal devices are disposed on both the gas inlet and outlet sides of the catalyst layer so as to remove the dust by these dust removal devices, with the result that the decline of the catalyst activity can be inhibited.

However, against the poisoning of the catalyst, there is no means for preventing the gaseous poisonous component from getting into the catalyst layer, and therefore the durability of the catalyst depends greatly upon a kind and an amount of poisonous materials contained in a fuel. In particular, the quality of a coal largely varies with its production area, and some coals produced in certain areas contain a great deal of arsenic having a very vigorous catalyst poison. When the coal containing such arsenic is used as the fuel, the deterioration of the catalyst is noticeable, and it is necessary to dispose a means for treating the exhaust gas containing arsenic, in addition to denitration facilities.

When the fuel is burnt in a furnace, most of arsenic in the fuel is gasified to form arsenic trioxide ($As_2O_3$). With regard to this $As_2O_3$ gas, the reaction of the formula (1) thermodynamically makes progress at a temperature in the vicinity of the provided denitration apparatus, so that diarsenic pentoxide ($As_2O_5$) is formed.

$$As_2O_3 + O_2 \rightarrow As_2O_5 \tag{1}$$

$As_2O_5$ formed in accordance with the formula (1) is in the form of a solid particle and hence is not taken in the catalyst, though it may be deposited on the surface of the catalyst. Therefore, the solid particle has little influence on the activity of the catalyst However, in fact, the deterioration of the catalyst by arsenic is observed. Judging from this fact, the reaction rate of the formula (1) is considered to be low, and in consequence, most of arsenic would be still present in the state of gaseous $As_2O_3$ in the vicinity of the catalytic layer.

The inventors of the present application have already suggested an ammonia catalyst reduction denitration process for a combustion exhaust gas containing an arsenic compound, the process comprising the step of disposing an adsorbent-filled layer for adsorbing and removing the arsenic compound in a combustion exhaust gas passage on the upstream side of a denitration catalyst-filled layer in order to prevent the denitration catalyst from deteriorating (Japanese Patent Application No. 61-209641).

However, in the above suggested process, materials of the arsenic adsorbents are disclosed, but physical properties of the materials suitable for the adsorption of arsenic are not elucidated at all.

OBJECT AND SUMMARY OF THE INVENTION

An object of the present invention is to provide an adsorbent having physical properties suitable for the adsorption of an arsenic compound in a combustion exhaust gas, and according to this adsorbent, an ammonia reduction denitration catalyst can be protected from poisoning with the arsenic compound.

Another object of the present invention is to provide a method for removing an arsenic compound from a combustion exhaust gas, the method being characterized by injecting an adsorbent having physical properties suitable for the adsorption of the arsenic compound into the combustion exhaust gas on the upstream side of an ammonia reduction denitration catalyst, when nitrogen oxides (NOx) in the combustion exhaust gas are reduced by the use of the ammonia reduction denitration catalyst, whereby the durability of the ammonia reduction denitration catalyst can be maintained, even if the catalyst is used in the combustion exhaust gas containing a great deal of the arsenic compound.

BRIEF DESCRIPTION OF THE DRAWINGS

FIGS. 1(A) and 1(B) are schematic views for explaining embodiments in which an adsorbent for an arsenic compound of the present invention is used for an exhaust gas from a boiler;

DETAILED DESCRIPTION OF PREFERRED EMBODIMENTS

Figure 2:
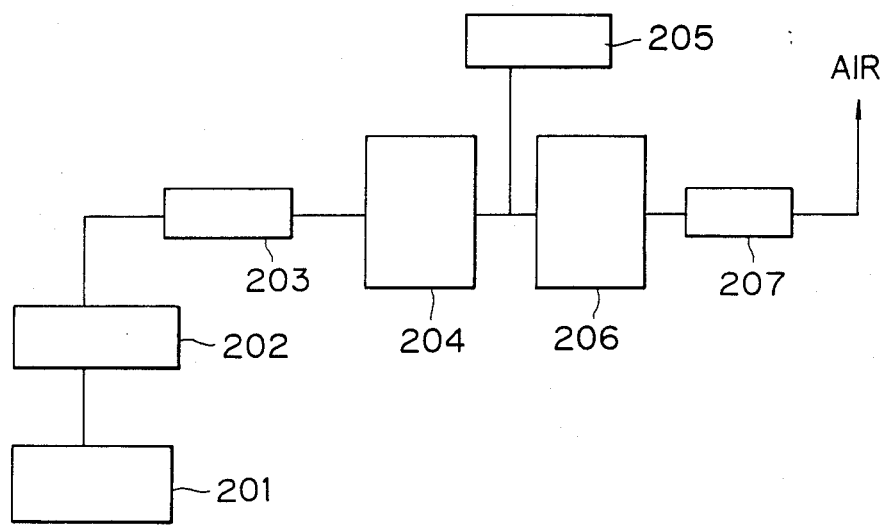
FIG. 2 is a schematic view of an apparatus used to measure an arsenic adsorption power of the adsorbent.

The present invention is directed to an adsorbent which is characterized by comprising an arsenic compound adsorbing material in which the total volume of pores is 0.2 to 0.7 cc/g, and the volume of the pores having a pore diameter of 300 Å or more is 10% or more with respect to the total pore volume; and a method for removing an arsenic compound from a combustion exhaust gas which is characterized by injecting an arsenic compound adsorbing material into the combustion exhaust gas on the upstream side of an ammonia reduction denitration catalyst, the arsenic compound adsorbing material being such that the total volume of pores is 0.2 to 0.7 cc/g, and the volume of the pores having a pore diameter of 300 Å or more is 10% or more with respect to the total pore volume.

A preferable material of the adsorbent has a high arsenic compound adsorption rate and a great adsorption volume. Such an adsorbent material is, for example, a compound mainly comprising an element selected from the group consisting of Ti, W, V, Fe, Ca, Mg, Ba, Mn, Cu, Zn, Sn, Al, Ni, Co, Si and Sr, and particularly one or a mixture of two or more of oxides thereof. Examples of these oxides include $TiO_2$, $WO_3$, $V_2O_5$, $Fe_2O_3$, CaO, MgO, BaO, MnO, CuO, ZnO, SnO, $Al_2O_3$, NiO, CoO, $SiO_2$ and SrO.

In addition, the adsorbent material may be a zeolite ion-exchanged with at least one selected from the group consisting of the above compounds and mixtures and/or alkali metals, alkali earth metals, Cu, Ag, Zn, Cd, B, Al, Ga, In, La, Ce, Ti, Zr, Si, Ge, Sn, Pb, P, Sb, Bi, V, Nb, Cr, Mo, W, Mn, Fe, Co and Ni; or a zeolite in which at least one of materials containing the above-mentioned elements and dolomite is supported. In necessary, the zeolite may contain a clay.

From the viewpoint of the effective adsorption of the arsenic compound, it is preferred that the total pore volume of the catalyst is large, but if the total pore volume is more than 0.7 cc/g, wear resistance of the catalyst will be extremely poor, the catalyst will be liable to be finely ground, and the fine catalyst particles will be difficult to be collected and recovered by a device on the downstream side. Therefore, such an excessively high total pore volume is not practical.

Inversely, if the total pore volume is less than 0.2 cc/g, the adsorption effect of the arsenic compound will be unpreferably poor, though wear resistance will be satisfactory. Moreover, the pore diameter of the adsorbent is 300 Å or more, and the greater the pore diameter is, the more preferable. The upper limit of the pore diameter is not particularly limited, since it is naturally restricted by strength necessary for the catalyst. However, one example of the upper limit is several thousand angstroms.

The mechanism where the arsenic compound in a vapor state is adsorbed on the adsorbent is considered to be as follows: The arsenic compound ($As_2O_3$) contained in the combustion exhaust gas diffuses and gets, in a molecular state, into the pores of the adsorbent and is converted into another arsenic compound ($As_2O_5$) having a low vapor pressure, and this compound is then adsorbed on the adsorbent. Therefore, it is preferable to increase adsorbing sites in the adsorbent for adsorbing the arsenic compound. For allowing these adsorbing sites to increase, it is important to control the pores in the adsorbent.

The present inventors made, from the above material, many adsorbent specimens in which pore distribution was changed, and test was then carried out to inspect adsorbability of the adsorbent specimens to the arsenic compound. As a result, it was confirmed that some of the adsorbent specimens were excellent in adsorbability in which the total volume of the pores was 0.2 to 0.7 cc/g, and the volume of the pores having a pore diameter of 300 Å or more was 10% or more, preferably 20 to 60%, with respect to the total pore volume.

In adsorbing and removing the arsenic compound from the combustion exhaust gas, the adsorbent of the present invention is injected into the exhaust gas on the upstream side of a denitrating reactor filled with an ammonia reduction denitration catalyst in order to adsorb the arsenic compound, so that the denitration catalyst is not brought into contact with the arsenic compound any more.

Figure 3:
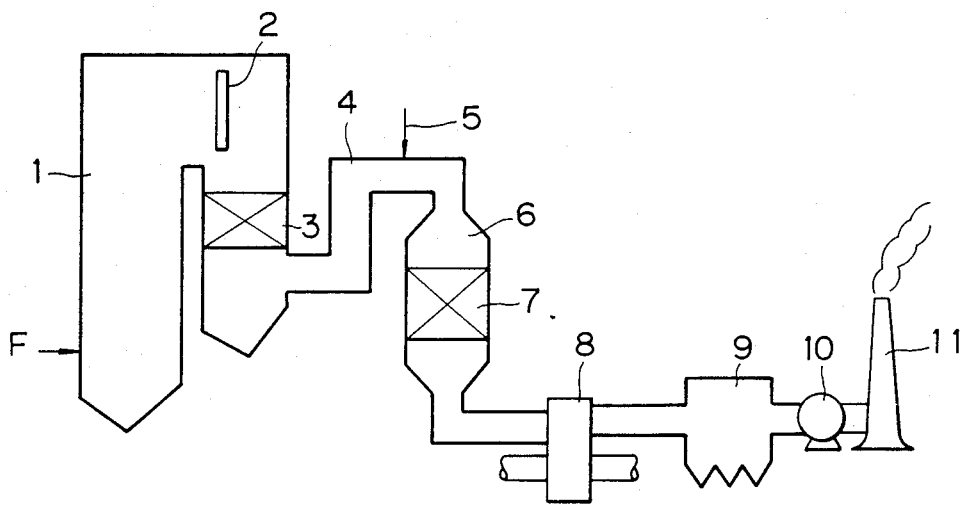
FIG. 3 is a schematic view for explaining a conventional method for denitrating a coal-fired boiler exhaust gas.

The position of the adsorbent injection lies on the upstream side of the denitrating reactor, and it is recommended to select the position having a combustion gas temperature optimum for the adsorbent to adsorb the arsenic compound. For example, the position for the adsorbent injection should be immediately in front of the denitrating reactor 6, the economizer 3, or the superheater 2 in FIG. 3.

Now, preparation procedures of the adsorbents of the present invention will be described in reference to examples. Afterward, data will be shown which are concerned with arsenic adsorbability of the adsorbents.

EXAMPLE 1

A mixture of 200 liters of a 15 wt % aqueous copper solution and 25 kg of an Na—Y type zeolite (Na-exchanged Y-type zeolite) was stirred at 65° C. for 30 minutes, and the zeolite was collected by filtration. After drying at 120° C. for 10 hours, the zeolite was calcined at 500° C. for 5 hours, thereby obtaining a Cu-supporting zeolite. It was found that the thus obtained zeolite contained 12.0 wt % of CuO and 2.5 wt % of $Na_2O$.

With regard to the obtained adsorbent, Table 5 sets forth a specific surface area, a pore volume, and a ratio of the volume of pores having a diameter of 300 Å or more to the total pore volume (similarly, results which will be measured in the following examples are set forth in Table 5).

EXAMPLE 2

Ammonia water was placed in 200 liters of a 15 wt % aqueous manganese nitrate solution in order to adjust its pH to 3.5. Into this aqueous solution, 25 kg of an Na-X type zeolite (Na-supporting X type zeolite) was poured, followed by stirring 45° C. for 1.5 hours. After collected by filtration, the zeolite was then washed with 30 liters of ion-exchanged water. The thus washed zeolite was dried at 120° C. for 12 hours and was then calcined at 500° C. for 5 hours. This zeolite contained 14 wt % of MnO.

EXAMPLE 3

Ammonia water was placed in 10 liters of a 20 wt % aqueous cerium nitrate solution in order to adjust its pH to 2.0. Into this aqueous solution, 1.5 kg of H-mordenite ($H^+$-supporting mordenite) was poured, followed by stirring 60° C. for 1 hour. After collected by filtration, the mordenite was dried at 120° C. for 12 hours and was then calcined at 500° C. for 5 hours. This mordenite contained 4.5 wt % of $Ce_2O_3$.

EXAMPLE 4

To 13 kg of mordenite containing 6 wt % of calcium in the form of CaO were added 3 kg of a clay (sericite) and 5 liters of ion-exchanged water, and 200 g of lignin sulfonic acid and 50 g of polyvinyl alcohol were added thereto, followed by kneading for 1 hour. After enough drying, this mixture was then calcined at 500° C. for 7 hours, thereby obtaining a powder which was composed of calcium mordenite and the clay.

EXAMPLE 5

To 12 kg of anatase type titanium oxide having a specific surface area of 95 $m^2/g$ were added 3 kg of an aqueous ammonium metatungustate solution containing 50 wt % of tungsten oxide ($WO_3$) and 2 kg of a clay, and 5 liters of ion-exchanged water was further added thereto with kneading, followed by 2 hours' kneading. After enough drying, the thus kneaded material was dried under ventilation at 90° C. for 5 hours and was then calcined at 550° C. for 7 hours, thereby obtaining a powder which had the same state as in Example 4.

EXAMPLE 6

To 12 kg of an $NH_4$-Y type zeolite ($NH_4^+$-supporting zeolite) were added 3 kg of anatase type titanium oxide (specific surface area 75 $m^2/g$), 1 kg of a clay (sericite) and 5.5 liters of ion-exchanged water, and while kneading, 200 g of lignin sulfonic acid, 50 g of carboxylmethyl cellulose and 100 g of glycerin were further added thereto, followed by 2 hours' kneading. The thus kneaded material was dried in the same manner as in Example 4 in order to obtain a powder having a similar state.

EXAMPLE 7

To a mixture of 5 kg of the Na-Cu-Y zeolite obtained in Example 1 and 1 kg of a clay (sericite) was added 1.7 liters of ion-exchanged water, and the mixture was then kneaded for 30 minutes. To the thus kneaded material were added 400 g of white carbon, 300 g of crystalline cellulose, 60 g of lignin sulfonic acid, 30 g of carboxymethyl cellulose, 75 g of polyvinyl alcohol and 70 ml of ion-exchanged water, followed by kneading for 1 hour. Furthermore, 600 g of iron oxide was added to this kneaded material, and 30 minutes' kneading was carried out. After enough drying, the kneaded material was then dried under ventilation at 90° C. for 5 hours, and temperature rise was made up to 550° C. at a rate of 50° C. per hour. Afterward, the material was calcined at 550° C. for 5 hours, thereby obtaining a powder having the same state as in Example 4.

EXAMPLE 8

To a mixture of 5 kg of the Na-Cu-Y zeolite obtained in Example 1 were added 1 kg of a clay (sericite) and 1.7 liters of ion-exchanged water, and the mixture was then kneaded for 30 minutes. To the thus kneaded material were added 20 g of polyethylele oxide, 20 g of carboxymethyl cellulose, 30 g of lignin sulfonic acid and 600 g of powdery iron oxide, followed by kneading for 2 hours. After sufficient drying, the kneaded material was then dried under ventilation at 90° C. for 5 hours, and was calcined at 550° C. for 7 hours, in order to obtain a powder having the same state as in Example 4.

EXAMPLE 9

To a mixture of 5.5 kg of the Na-Cu-Y zeolite obtained in Example 1 and 500 g of a clay (attapulgite) was added 3.2 liters of ion-exchanged water, and the mixture was then kneaded for 30 minutes. To the thus kneaded material were added 30 g of polyethylene oxide, 20 g of carboxymethyl cellulose, 60 g of lignin sulfonic acid, 100 g of polyvinyl alcohol, 300 g of polymethyl methacrylate and 420 g of crystalline cellulose, and 1.5 hours' kneading was then carried out. To this kneaded material were added 500 g of titanium oxide and 600 g of iron oxide, followed by kneading for 30 minutes. After enough drying, the kneaded material was dried under ventilation at 90° C. for 5 hours and was then calcined at 550° C. for 7 hours in order to obtain an adsorbent having the same state as in Example 4.

EXAMPLES 10 TO 15

A powder comprising the calcium mordenite prepared in Example 4 and a clay was impregnated with each of aqueous nitrate solutions shown in Table 1 in order to prepare a powder having composition in Table 1. In each case, after impregnation, the powder was dried overnight at 120° C., and calcination was then carried out at 500° C. for 5 hours.

TABLE 1

| Example No. | Chemical Comp. of Starting Metallic Salt | Conc. of Metallic Oxide* (wt %) | Composition of Adsorbent (wt %) | | | |
|---|---|---|---|---|---|---|
| | | | Mordenite | Clay | CaO | MOx** |
| 10 | $Ce(NO_3)_3 \cdot 6H_2O$ | 12 ($Ce_2O_3$) | 67.2 | 16.5 | 4.3 | 12.0 |
| 11 | $La(NO_3)_3 \cdot 6H_2O$ | 12 ($La_2O_3$) | 67.2 | 16.5 | 4.3 | 12.0 |
| 12 | $In(NO_3)_3 \cdot 3H_2O$ | 10 ($In_2O_3$) | 68.8 | 16.8 | 4.4 | 10.0 |
| 13 | $Co(NO_3)_2 \cdot 6H_2O$ | 11 (CoO) | 68.0 | 16.6 | 4.4 | 11.0 |
| 14 | $Ni(NO_3)_2 \cdot 6H_2O$ | 14 (NiO) | 65.7 | 16.1 | 4.2 | 14.0 |

TABLE 1-continued

| Example No. | Chemical Comp. of Starting Metallic Salt | Conc. of Metallic Oxide* (wt %) | Composition of Adsorbent (wt %) | | | |
|---|---|---|---|---|---|---|
| | | | Mordenite | Clay | CaO | MOx** |
| 15 | Cr(NO$_3$)$_3$.9H$_2$O | 12 (CrO) | 67.2 | 16.5 | 4.3 | 12.0 |

*Metallic oxide in the adsorbent
**Impregnated metallic oxide

EXAMPLE 16

To 8 kg of anatase type titanium oxide (specific surface area 55 m$^2$/g was added 4 liters of ion-exchanged water, and while kneading, a pH was adjusted to 7.5 with 16 wt % ammonia water. Afterward, to the kneaded material were added 17.5 kg of Na-exchanged Y type zeolite (which supported 15 wt % of Na$_2$O), 120 g of carboxymethyl cellulose, 240 g of lignin sulfonic acid, 60 g of polyethylene oxide and 7 liters of ion-exchanged water, and the mixture was then kneaded at a temperature of 50° to 60° C. for 1 hour. After dried at 50° C., the resulting powder was calcined at 550° C. for 5 hours in order to prepare an absorbent.

EXAMPLE 17

First, 12 kg of a Mg-supporting natural zeolite (Trade Name Izukalight; support ratio of Mg in terms of MgO=3:1 wt %) and 6 liters of ion-exchanged water were added to 5 kg of titanium oxide prepared by calcining, at 700° C., hydrated titanium oxide which was a raw material in the production of titanium oxide by a sulfuric acid method, and the mixture was then kneaded for 30 minutes. After kneading, 170 g of lignin sulfonic acid and 100 g of carboxymethyl cellulose were added thereto, and the mixture was then kneaded at a temperature of 50° to 70° C. for 1.5 hours. Afterward, the same procedure as in Example 16 was carried out to prepare an absorbent.

EXAMPLE 18

To a mixture of 5 kg of titanium oxide (specific surface area 45 m$^2$/g) and 3 kg of acidic terra abla was added 4 liters of ion-exchanged water, and while the mixture was kneaded, a pH was adjusted to 7.0 with 16 wt % ammonia water. Afterward, to this kneaded material were added 17.2 kg of an Na-Ca-Y type zeolite (4 wt % of Na in terms of Na$_2$O and 11.8 wt % of Ca in terms of CaO), 120 g of carboxymethyl cellulose, 240 g of lignin sulfonic acid, 60 g of polyethylene oxide and 5 liters of ion-exchanged water, and kneading was then carried out at a temperature of 50° to 60° C. for 1 hour. Afterward, the same procedure as in Example 16 was used to prepare an absorbent.

EXAMPLE 19

Eight liters of ion-exchanged water was added to a mixture of 15 kg of an X type zeolite (48 wt % of Na$_2$O and 25 wt % of BaO) in which Na and Ba were supported by ion exchange and 6 kg of a clay, and 270 g of lignin sulfonic acid, and 130 g of carboxymethyl cellulose were further added thereto. The mixture was then kneaded at a temperature of 60° to 70° C. for 2 hours, and afterward, the same procedure as in Example 16 was used to prepare an adsorbent.

EXAMPLE 20

To 720 g of a metatitanic acid slurry (content of TiO$_2$=30 wt %) was added ammonia water containing 25% of NH$_3$ in order to adjust a pH to 6.5. Then, 27 g of powdery ammonium paratungstate was added thereto, and the mixture was then kneaded in a wet state for 2 hours and was calcined at 680° C. for 5 hours in order to prepare a powder composed of titanium oxide and tungsten oxide.

An aqueous ammonium metavanadate solution was added to the thus prepared powder so that the concentration of vanadium might be 0.7 wt % in terms of V$_2$O$_5$, and after sufficient mixing, the mixture was calcined at 450° C. for 4 hours to obtain a powder (A) composed of titanium, tungsten and vanadium.

To the powder (A) were added 50 g of a Y type zeolite (cation=NH$_4$) having a specific surface area of 610 m$^2$/g and a pore volume of 0.33 cc/g, 5 g of carboxymethyl cellulose, 25 g of polyethylene oxide and a suitable amount of water, and the mixture was then kneaded for 30 minutes. After drying, the mixture was then calcined at 500° C. for 5 hours. The thus obtained adsorbent had the physical properties that a specific surface area was 125 m$^2$/g and a pore volume was 0.31 cc/g.

EXAMPLE 21

To 200 g of the powder (A) prepared in Example 20 were added 50 g of a synthetic zeolite (molecular sieve 13X) having a specific surface area of 720 m$^2$/g and a pore volume of 0.35 cc/g, 5 g of carboxymethyl cellulose, 2.5 g of polyethylene oxide and a suitable amount of water, and the mixture was then kneaded for 30 minutes. After drying, the mixture was calcined at 500° C. for 5 hours. The thus obtained adsorbent had the physical properties that a specific surface area was 158 m$^2$/g and a pore volume was 0.20 cc/g.

EXAMPLE 22

The same procedure as in Example 20 was repeated with the exception that 250 g of water-dispersed colloidal silica (SiO$_2$ content=20 wt %) was used, in order to prepare an adsorbent.

The used colloidal silica, when dried at 120° C., had physical values of a specific surface area=180 m$^2$/g and a pore volume=0.7 cc/g. The thus obtained adsorbent showed physical values of a specific surface area=127 m$^2$/g and a pore volume=0.36 cc/g.

EXAMPLES 23 TO 25

Following the procedure of Example 20, components of carriers were changed to prepare powdery adsorbents. Each carrier component was added so that its concentration might be 20 wt %. Table 2 sets forth physical values of the adsorbents.

TABLE 2

| Example No. | Carrier | Specific Surface Area (m$^2$/g) | Volume of Pores (cc/g) |
|---|---|---|---|
| 23 | Silica · Alumina | 103 | 0.37 |
| 24 | Silica · Magnesia | 122 | 0.34 |

TABLE 2-continued

| Example No. | Carrier | Specific Surface Area (m²/g) | Volume of Pores (cc/g) |
|---|---|---|---|
| 25 | Silica · Alumina · Magnesia | 110 | 0.39 |

EXAMPLES 26 TO 31

To 12 kg of anatase type titanium oxide having a specific surface area of 110 m²/g was added 2 kg of a clay, and while the mixture was kneaded, 5 liters of ion-exchanged water was added thereto, followed by kneading for 2 hours. After sufficient drying, the mixture was then dried under ventilation at 90° C. for 5 hours.

This mixture was further impregnated with each aqueous nitrate solution shown in Table 3 to prepare a powder containing a metallic oxide in Table 3. In each case, after the impregnation, the mixture was dried overnight at 120° C. and was then calcined at 500° C. for 5 hours.

TABLE 3

| Example No. | Chem. Comp. of Starting Metallic Salt | Metallic Oxide Form | Conc. (wt %) |
|---|---|---|---|
| 26 | Ca(NO₃)₂·4H₂O | CaO | 10 |
| 27 | Mg(NO₃)₂·6H₂O | MgO | 12 |
| 28 | Ba(NO₃)₂ | BaO | 10 |
| 29 | Mn(NO₃)₂·6H₂O | MnO | 11 |
| 30 | Fe(NO₃)₃·9H₂O | Fe₂O₃ | 13 |
| 31 | Cu(NO₃)₂·3H₂O | CuO | 10 |

COMPARATIVE EXAMPLE 1

First, 6 kg of a Cu-Na-Y zeolite powder prepared in Example 1 was ground for 75 hours with the aid of a mill (Atoriter) using balls of 2 mm in diameter. To a mixture of 5.5 kg of this ground Cu-Na-Y zeolite and 500 g of a clay was added 4.2 liters of ion-exchanged water, and kneading was then carried out for 30 minutes. Afterward, 1 liter of a 20% oxalic acid solution was added thereto, followed by kneading for 4 hours. To the kneaded material was added 50 g of polyvinyl alcohol, 60 g of lignin sulfonic acid and 1.5 kg of iron hydroxide containing 40 wt % of Fe in terms of $Fe_2O_3$, and 1 hour's kneading was performed. After enough drying, the kneaded material was dried under ventilation at 90° C. for 5 hours and was then calcined at 650° C. for 7 hours, thereby obtaining an adsorbent having the same state as in Example 4.

This adsorbent had a pore volume of 0.19 m²/g and a specific surface area of 60 m²/g.

Next, reference will be made to a measuring procedure of an arsenic adsorbing power of the adsorbents prepared in Examples 1 to 31 as well as results in accordance with an experimental example.

EXPERIMENTAL EXAMPLE 1

For the adsorbents prepared in Examples 1 to 31, arsenic adsorbing powers were measured by the use of an arsenic adsorbing power measuring apparatus shown in FIG. 2.

In a gas feed section 201, a gas was generated, and a gas flow rate was controlled in a gas flow rate control section 202. The gas was then led to a humidifier 203, in which its humidity was adjusted, and it was introduced into an arsenic generating section 204. An $As_2O_3$ powder was placed in a reaction tube in the arsenic generating section 204 in which temperature could be adjusted. When the temperature in the reaction tube had reached a predetermined level, the $As_2O_3$ powder was gasified add then introduced together with the introduction gas into a gas mixing section 206 in which temperature was maintained at a predetermined level. An adsorbent feed section 205 was connected to a pipe portion between the arsenic generating section 204 and gas mixing section 206. From this adsorbent feed section 205, a powdery adsorbent was injected and added to the gas containing $As_2O_3$ vapor, and the adsorbent and the $As_2O_3$ vapor were brought into contact with each other in the gas mixing section 206. After a predetermined interval of time, the adsorbent was collected on the outlet side of the gas mixing section 206, and the unreacted $As_2O_3$ vapor was discharged into the atmosphere through a residual $As_2O_3$ collecting section 207.

Measurement conditions for the $As_2O_3$ adsorbing power of the adsorbents are set forth in Table 4, and a formula for calculating an adsorption ratio is as follows:

Adsorption ratio=(feed of $As_2O_3$—amount of residual $As_2O_3$)/(feed of $As_2O_3$)×100

TABLE 4

| Conditions for Arsenic Adsorption Test | | | | | | | | |
|---|---|---|---|---|---|---|---|---|
| Gas Temp. °C. | Gas Flow Rate liter min | Test Time Hr | Feed of Adsorbent g/min | Gas Composition | | | | |
| | | | | As₂O₃ ppm | O₂ % | SO₂ ppm | H₂O % | N₂ % |
| 350 | 2 | 0.15 | 2 | 100 | 4 | 1000 | 10 | * |

*Residue of the gas composition

Table 5 given below shows measured values. In this table, the item of "adsorbent" represents adsorbents prepared in Examples 1 to 32.

TABLE 5

| Composition of Arsenic Adsorbent and Test Results of Arsenic Adsorption | | | | | | |
|---|---|---|---|---|---|---|
| Example No. | Adsorbent | State[3] | Specific Surface Area (m²/g) | Volume of Pore (cc/g) | Ratio[2] of Pores (%) | Ratio[1] of Adsorption (%) |
| 1 | Na—Y Type Zeolite + CuO | 4 Microns | 420 | 0.45 | 40 | 47 |
| 2 | Na—X Type Zeolite + MnO | 3 Microns | 380 | 0.58 | 50 | 66 |
| 3 | H+-Supporting Mordenite + Ce₂O₃ | 6 Microns | 480 | 0.62 | 55 | 49 |
| 4 | CaO + Mordenite + Clay | 5 Microns | 180 | 0.43 | 20 | 30 |
| 5 | TiO₂ + WO₃ + Clay | 2 Microns | 75 | 0.38 | 15 | 28 |
| 6 | Y Type Zeolite + TiO₂ + Clay | 5 Microns | 120 | 0.40 | 50 | 25 |
| 7 | Na—Y Type Zeolite + Cu + Iron Oxide + Clay | 3 Microns | 140 | 0.55 | 40 | 35 |

TABLE 5-continued

Composition of Arsenic Adsorbent and Test Results of Arsenic Adsorption

| Example No. | Adsorbent | State[3] | Specific Surface Area ($m^2/g$) | Volume of Pore (cc/g) | Ratio[2] of Pores (%) | Ratio[1] of Adsorption (%) |
|---|---|---|---|---|---|---|
| 8 | Na—Y Type Zeolite + Cu + Iron Oxide + Clay[4] | 4 Microns | 100 | 0.35 | 15 | 20 |
| 9 | Na—Y Type Zeolite + Cu + $TiO_2$ + Iron Oxide + Clay | 6 Microns | 120 | 0.67 | 50 | 28 |
| 10 | CaO + Mordenite + Clay + $Ce_2O_3$ | 6 Microns | 110 | 0.35 | 15 | 21 |
| 11 | CaO + Mordenite + Clay + $Ce_2O_3$ + $La_2O_3$ | 5 Microns | 122 | 0.38 | 20 | 27 |
| 12 | CaO + Mordenite + Clay + $Ce_2O_3$ + $In_2O_3$ | 3 Microns | 115 | 0.37 | 15 | 29 |
| 13 | CaO + Mordenite + Clay + $Ce_2O_3$ + CeO | 4 Microns | 120 | 0.36 | 10 | 26 |
| 14 | CaO + Mordenite + Clay + $Ce_2O_3$ $O_3$ + NiO | 4 Microns | 125 | 0.36 | 10 | 26 |
| 15 | CaO + Mordenite + Clay + $Ce_2O_3$ + CrO | 2 Microns | 118 | 0.35 | 10 | 28 |
| 16 | Na—Y Type Zeolite + $TiO_2$ | 7 Microns | 400 | 0.58 | 45 | 38 |
| 17 | Mg—Natural Zeolite + $TiO_2$ | 6 Microns | 460 | 0.63 | 55 | 42 |
| 18 | Na—Ca—Y Type Zeolite + $TiO_2$ + Acidic Terra Abla | 5 Microns | 350 | 0.62 | 50 | 40 |
| 19 | Na—Ba—X Type Zeolite + Clay | 6 Microns | 370 | 0.55 | 60 | 41 |
| 20 | Y Type Zeolite + $TiO_2$ + $V_2O_5$ + $WO_3$ | 3 Microns | 125 | 0.31 | 45 | 29 |
| 21 | Synthetic Zeolite + $TiO_2$ + $V_2O_5$ + $WO_3$ | 4 Microns | 158 | 0.20 | 50 | 27 |
| 22 | $SiO_2$ + $V_2O_3$ + $WO_3$ | 7 Microns | 127 | 0.36 | 30 | 25 |
| 23 | $SiO_2$ + $Al_2O_3$ + $V_2O_5$ + $WO_3$ | 5 Microns | 103 | 0.37 | 20 | 26 |
| 24 | $SiO_2$ + MgO + $V_2O_5$ + $WO_3$ | 5 Microns | 122 | 0.34 | 15 | 25 |
| 25 | $SiO_2$ + $Al_2O_3$ + MgO + $V_2O_5$ + $WD_3$ | 4 Microns | 110 | 0.39 | 15 | 28 |
| 26 | $TiO_2$ + CaO | 3 Microns | 65 | 0.35 | 10 | 21 |
| 27 | $TiO_2$ + MgO | 6 Microns | 70 | 0.38 | 20 | 33 |
| 28 | $TiO_2$ + BaO | 5 Microns | 72 | 0.30 | 15 | 22 |
| 29 | $TiO_2$ + MnO | 6 Microns | 68 | 0.32 | 10 | 21 |
| 30 | $TiO_2$ + $Fe_2O_3$ | 4 Microns | 66 | 0.28 | 10 | 25 |
| 31 | $TiO_2$ + CuO | 2 Microns | 64 | 0.27 | 10 | 26 |

[1] An adsorption ratio of arsenic.
[2] A ratio of the volume of pores having a diameter of 300Å or more to the volume of the total pores.
[3] A powder having a shown average grain diameter.
[4] The adsorbent in Example 8 was the same as in Example 7 with the exception that an added cellulose was different.

EXPERIMENTAL EXAMPLE 2

In order to elucidate an influence of reaction temperature, adsorption tests were carried out changing temperatures in the range of 350° to 900° C. by the use of the adsorbents prepared in Examples 1, 4, 22, 26 and 28. The other conditions were as in Table 4. The results are set forth in Table 6.

TABLE 6

Results of Adsorption Test

| Adsorbent (Procedure) | Gas Temp. | Adsorption Ratio |
|---|---|---|
| Na—Y Type Zeolite + CuO | 350° C. | 47% |
| (Example 1) | 500° C. | 52% |
| | 700° C. | 72% |
| | 900° C. | 65% |
| CaO + Mordenite + Cly | 350° C. | 30% |
| (Example 4) | 500° C. | 41% |
| | 700° C. | 65% |
| | 900° C. | 78% |
| $SiO_2$ + $V_2O_5$ + $WO_2$ | 350° C. | 25% |
| (Example 22) | 500° C. | 38% |
| | 700° C. | 47% |
| | 900° C. | 57% |
| $TiO_2$ + CaO | 350° C. | 21% |
| (Example 26) | 500° C. | 31% |
| | 700° C. | 38% |
| | 900° C. | 40% |
| $TiO_2$ + BaO | 350° C. | 22% |
| (Example 28) | 500° C. | 29% |
| | 700° C. | 37% |

TABLE 6-continued

Results of Adsorption Test

| Adsorbent (Procedure) | Gas Temp. | Adsorption Ratio |
|---|---|---|
| | 900° C. | 39% |

As be apparent from the results shown in the above table, the higher the temperature is, the higher the adsorption ratio of arsenic is.

EXPERIMENTAL EXAMPLE 3

For the adsorbent having a total pore volume of 0.19 cc/g prepared in Comparative Example 1, its $As_2O_3$ adsorption power was measured changing temperatures in the same manner as in Experimental Examples 1 and 2. The results are set forth in Table 7.

TABLE 7

Results of Adsorption Test

| Adsorbent (Procedure) | Gas Temp. | Adsorption Ratio |
|---|---|---|
| Cu—Na—Y Type Zeolite | 350° C. | 8% |
| (Comp. Example 1) | 500° C. | 9% |
| | 700° C. | 11% |
| | 900° C. | 9% |

As be apparent from the above experimental results, in the case of the adsorbent which has a total pore volume of 0.2 to 0.7 cc/g and in which the volume of pores having a diameter of 300 Å or more to the volume of the total pores is 10% or more, an adsorption ratio for the $As_2O_3$ gas is liable to increase along with the increase of the total pore volume, and the adsorption ratios are in the range of 20 to 66%.

It is appreciated from the aforesaid results that the powder having the above-mentioned pore characteristics can be used as the adsorbent for the $As_2O_3$ gas.

Since it can be made definite that each kind of adsorbent has inherent temperature characteristics, it is possible to select, as an injection and spray position of the adsorbent, an extensive temperature section of a high-temperature region in a boiler furnace to a low-temperature region immediately in front of a denitration device.

In these experiments, the used gas had an $As_2O_3$ concentration of 100 ppm, but an exhaust gas from a boiler has a concentration of about 0.01 ppm. Therefore, the adsorption period in a practical case corresponds to a period 10,000 times as much as in the experiment.

EXAMPLE 32

Now, a method for removing an arsenic compound from a combustion exhaust gas according to the present invention will be described in detail as an example in reference to FIGS. 1 (A) and 1 (B). In FIG. 1, the same reference numerals as in FIG. 3 denote the same members, and numerals 12 and 13 are an injection portion of an adsorbent and a gas sampling portion at an inlet of a denitrating device, respectively.

An exhaust gas form a combustion type boiler 1 was led to a denitrating reactor 6 through an economizer and a flue 4. An ammonia gas necessary for denitration reaction was injected through an ammonia injector 5 of the flue 4 into the exhaust gas. Nitrogen oxides in the exhaust gas were decomposed into nitrogen and water during passing through a catalyst layer 7 disposed in a denitrating reactor 6. Next, the exhaust gas was subjected to a post-treatment by an air heater 8 or the like, and was then discharged into the atmosphere through a chimney not shown.

The adsorbent injected and sprayed into the exhaust gas was collected by an electric dust collector (not shown) disposed on the downstream side of the air heater 8, and therefore the used adsorbent was prevented from being discharged from the system through the chimney.

In the embodiment illustrated in FIG. 1 (A), the adsorbent injecting pipe 12 is provided at the outlet of the economizer 3, and temperature was in the range of about 400° to about 500° C. FIG. 1 (B) shows the embodiment in which the adsorbent injecting pipe 12 is provided at the inlet of the denitrating reactor 6 and temperature was in the range of 300° to 450° C. The position of the adsorbent injecting pipe 12 depends upon a kind of adsorbent. In the embodiment in FIG. 1 (A), the Ca-mordenite-clay adsorbent was employed, and in the embodiment in FIG. 1 (B), the Na-Y type zeolite adsorbent containing CuO was employed. However, these adsorbents are not restrictive, and the optional adsorbent having desired temperature characteristics can be used selectively.

The gas was sampled through a flue 13 disposed in the vicinity of the inlet of the denitrating reactor 6, while the adsorbent was continuously injected and sprayed into the flue 4, in order to inspect a concentration of arsenic in the exhaust gas. The results are set forth in Table 8.

TABLE 8

| | Analytical Results of Arsenic Conc. in Exhaust Gas | |
|---|---|---|
| | Conc. of Arsenic (in terms of $As_2O_3$) in Exhaust Gas | |
| Adsorbent (Procedure) | Before Spray of Adsorbent (ppm) | After Spray of Adsorbent (ppm) |
| CaO + Mordenite + Clay (Example 4) | 0.01 | 0.002 |
| NaO—Y Type Zeolite + CuO (Example 1) | 0.01 | 0.005 |

The above results indicate that the concentration of arsenic in the exhaust gas sprayed with the adsorbent is about half or less of an arsenic concentration in the gas before the spray, which means that the injected and sprayed adsorbent is effective.

As discussed above, the present invention permits remarkably decreasing the amount of the arsenic compound in the exhaust gas coming from a boiler and the like, so that poisoning an ammonia reduction denitration catalyst with the arsenic compound can be outstandingly inhibited in order to maintain its high performance. In consequence, it is fair to say that the present invention is industrially very effective.

We claim:

1. A method for removing arsenic oxides from a combustion exhaust gas which comprises the step of injecting an adsorbent for arsenic oxides into a combustion exhaust gas on the upstream side of an ammonia reduction denitrating catalyst, said adsorbent being such that the total volume of pores is 0.2 to 0.7 cc g and the volume of the pores having a pore diameter of 300 Å or more is 10% or more with respect to the total pore volume.

2. A method for removing arsenic oxides according to claim 10 wherein arsenic oxide adsorbing material comprises a compound composed predominantly of an element selected from the group consisting of Ti, W, V, Fe, Ca, Mg, Ba, Mn, Cu, Zn, Sn, Al, Ni, Co, Si and Sr; one or more oxides thereof; a zeolite ion-exchanged with at least one element selected from the group consisting of alkali metals, alkali earth metals, Cu, Ag, Zn, Cd, B, Al, Ga, In, La, Ce, Ti, Zr, Si, Ge, Sn, Pb, F, Sb, Bi, V, Nb, Cr, Mo, W, Mn, Fe, Co and Ni; or a zeolite in which at least one of mixture of said elements and dolomite is supported.

3. The method of claim 2 wherein said zeolite contains a clay.

4. A method for removing arsenic oxides according to claim 1 wherein the temperature of said combustion exhaust gas in said position where said adsorbent is injected is in the range of 350° to 900° C.

5. A method for removing arsenic oxides according to claim 1 wherein in treating said combustion exhaust gas by guiding said gas from a combustion device through an economizer to said denitrating reactor filled with said ammonia reduction denitrating catalyst, said adsorbent is injected into a position in the vicinity of an outlet of said economizer.

* * * * *

REEXAMINATION CERTIFICATE (1912th)

United States Patent [19]

Miyazawa et al.

[11] B1 4,869,735

[45] Certificate Issued  Jan. 26, 1993

[54] ADSORBENT FOR ARSENIC COMPOUND AND METHOD FOR REMOVING ARSENIC COMPOUND FROM COMBUSTION GAS

[75] Inventors: Masaki Miyazawa; Norihisa Kobayashi, both of Tokyo; Hiromu Takatsuka, Nagasaki; Atsushi Morii, Nagasaki; Toshio Koyanagi, Nagasaki; Touru Seto, Hiroshima; Kozo Iida, Hiroshima; Shigeaki Mitsuoka, Hiroshima; Hiroaki Rikimaru, Osaka; Makoto Imanari; Takeo Koshikawa, both of Ibaragi; Akihiro Yamauchi, Koganei; Masayuki Hanada, Kitakyushu; Morio Fukuda, Kitakyushu; Kiyoshi Nagano, Kitakyushu, all of Japan

[73] Assignees: Mitsubishi Jukogyo Kabushiki Kaisha, Tokyo; Sakai Chemical Industry Co., Ltd., Osaka; Mitsubishi Petrochemical Co., Ltd., Tokyo; Mitsubishi Petrochemical Engineering Co., Ltd., Tokyo; Catalysts & Chemicals Industries Co., Ltd., Tokyo, all of Japan Reexamination Request:
  No. 90/002,632, Feb. 6, 1992

Reexamination Certificate for:
  Patent No.: 4,869,735
  Issued: Sep. 26, 1989
  Appl. No.: 187,470
  Filed: Apr. 28, 1988

[30] Foreign Application Priority Data

Apr. 30, 1987 [JP] Japan ............... 62-104447

[51] Int. Cl.$^5$ ................ B01D 19/00; B01D 53/02
[52] U.S. Cl. ........................ 55/72; 55/74; 55/75; 423/210; 423/239; 423/328; 423/592; 423/604; 423/605; 423/606; 423/608; 423/610; 423/618; 423/622; 423/625; 423/628; 423/633; 423/635
[58] Field of Search ............ 55/68, 72, 74, 75; 423/210, 239

[56] References Cited

U.S. PATENT DOCUMENTS 798,302  8/1905  Scharff et al. ............... 55/72
3,812,653  5/1974  Massoth et al. .
4,019,879  4/1977  Rabo et al. .
4,435,278  3/1984  Chen .
4,474,896  10/1984  Chao .
4,499,202  2/1985  Arias et al. .
4,632,914  12/1986  Arias et al. .
4,670,132  6/1987  Arias et al. .
4,683,125  7/1987  Yusa .

FOREIGN PATENT DOCUMENTS 1205512  of 1969  European Pat. Off. .
0032298  7/1981  European Pat. Off. .
0083163  7/1983  European Pat. Off. .
0121339  10/1984  European Pat. Off. .
0122180  10/1984  European Pat. Off. .
0170884  2/1986  European Pat. Off. .
0173507  3/1986  European Pat. Off. .
0194366  9/1986  European Pat. Off. .
0256359  2/1988  European Pat. Off. .
0259883  3/1988  European Pat. Off. .
1930001  6/1970  Fed. Rep. of Germany .
2841565  4/1980  Fed. Rep. of Germany .
3314192  12/1983  Fed. Rep. of Germany .
3511919  10/1985  Fed. Rep. of Germany .
8503455  8/1985  PCT Int'l Appl. .
1589213  5/1981  United Kingdom .

OTHER PUBLICATIONS

Otto Grubner, "Molekularsiebe", E. Krell 'Physikalisch-chemische Trennund Messmethoden', vol. 12, 1986, VEB Deutscher Verlag der Wissenschaften.

A. Mersmann, "Stoffübertragung", U. Grigull. Wärme- und Stoffübertragung Springer Verlag 1986.

H. Brauer, et al "Air Pollution Control Equipment", 1981, Springer Verlag p. 326, Table 2.

*Primary Examiner*—Wayne A. Langel

[57]  ABSTRACT

Here is provided an adsorbent for adsorbing and removing an arsenic compound which becomes a catalyst poison in a selective contact reduction process for removing nitrogen oxides (NOx) from a combustion exhaust gas by the use of an ammonia as a reducing agent and a denitrating catalyst.

The adsorbent of the present invention comprises a material in which the total volume of pores is 0.2 to 0.7 cc/g and the volume of the pores having a pore diameter of 300 Å or more is 10% or more with respect to the total pore volume, and the material is a specific element, its oxide, an ion-exchanged zeolite or the like.

In addition, the present invention is directed to a method for removing the arsenic compound from the combustion exhaust gas by injecting the adsorbent into the flow of the gas on the upstream side of the denitrating catalyst.

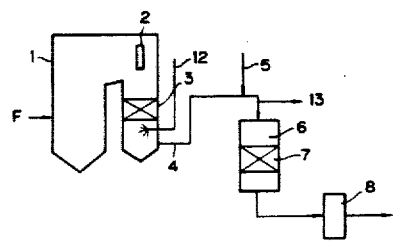

B1 4,869,735

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claims 3–5, dependent on an amended claim, are determined to be patentable.

1. A method for removing arsenic oxides from a combustion exhaust gas *which contains arsenic oxides* which comprises the step of injecting an adsorbent for arsenic oxides into [a] *said* combustion exhaust gas on the upstream side of an ammonia reducing denitrating catalyst, said adsorbent being such that the total volume of pores is 0.2 to 0.7 [cc g] *cc/g* and the volume of the pores having a pore diameter of 300 Å or more is 10% or more with respect to the total pore volume.

2. A method for removing arsenic oxides according to claim [10] *1* wherein *the* arsenic oxide adsorbing material comprises a compound composed predominantly of an element selected from the group consisting of Ti, W, V, Fe, Ca, Mg, Ba, Mn, Cu, Zn, Sn, Al, Ni, Co, Si and Sr; one or more oxides thereof; a zeolite ion-exchanged with at least one element selected from the group consisting of alkali metals, [alkali] *alkaline* earth metals, Cu, Ag, Zn, Cd, B, Al, Ga, In, La, Ce, Ti, Zr, Si, Ge, Sn, Pb, F, Sb, Bi, V, Nb, Cr, Mo, W, Mn, Fe, Co, and Ni; or a zeolite [in which] *supporting* at least one [of] mixture of said elements and dolomite [is supported].

* * * * *